(12) United States Patent
Takenaka et al.

(10) Patent No.: US 8,493,486 B2
(45) Date of Patent: Jul. 23, 2013

(54) IMAGE PICKUP APPARATUS, IMAGE PICKUP SYSTEM, AND DRIVING METHOD OF IMAGE PICKUP APPARATUS

(75) Inventors: Shintaro Takenaka, Yokohama (JP); Hidetoshi Hayashi, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 13/106,712

(22) Filed: May 12, 2011

(65) Prior Publication Data
US 2011/0285887 A1  Nov. 24, 2011

(30) Foreign Application Priority Data
May 20, 2010  (JP) ................. 2010-116398

(51) Int. Cl.
*H04N 5/335* (2011.01)
*H04N 3/14* (2006.01)
*G11C 8/00* (2006.01)

(52) U.S. Cl.
USPC ........... 348/302; 348/312; 348/300; 348/296; 365/230.06; 365/230.08

(58) Field of Classification Search
USPC ................. 348/301, 302, 308, 312, 296, 294, 348/300; 250/208.1; 257/292; 365/230.06, 365/230.08, 189.15, 189.16
See application file for complete search history.

(56) References Cited

U.S. PATENT DOCUMENTS

| | | | |
|---|---|---|---|
| 6,920,078 B2* | 7/2005 | Cho | 348/E3.018 |
| 7,839,703 B2* | 11/2010 | Baker | 365/189.15 |
| 8,314,871 B2* | 11/2012 | Fujita et al. | 348/302 |
| 2002/0018600 A1* | 2/2002 | Lyon et al. | 382/305 |
| 2007/0201090 A1* | 8/2007 | Shigematsu et al. | 358/1.15 |
| 2008/0284876 A1* | 11/2008 | Makino | 348/296 |
| 2010/0201856 A1* | 8/2010 | Hayashi et al. | 348/296 |
| 2011/0013045 A1* | 1/2011 | Tay | 348/308 |

FOREIGN PATENT DOCUMENTS

| | | |
|---|---|---|
| JP | 2000-350103 A | 12/2000 |
| JP | 2008-288903 A | 11/2008 |

* cited by examiner

*Primary Examiner* — Nhan T Tran
(74) *Attorney, Agent, or Firm* — Canon USA Inc. IP Division

(57) ABSTRACT

In a conventional image pickup apparatus, a plurality of reset methods for resetting a photodiode cannot be set. A row selection unit is provided with a first storage unit for storing an address of a read row, a second storage unit for storing an address of a shutter row, and further a third storage unit for storing an address of a row in which potential of photodiode is fixed.

16 Claims, 11 Drawing Sheets

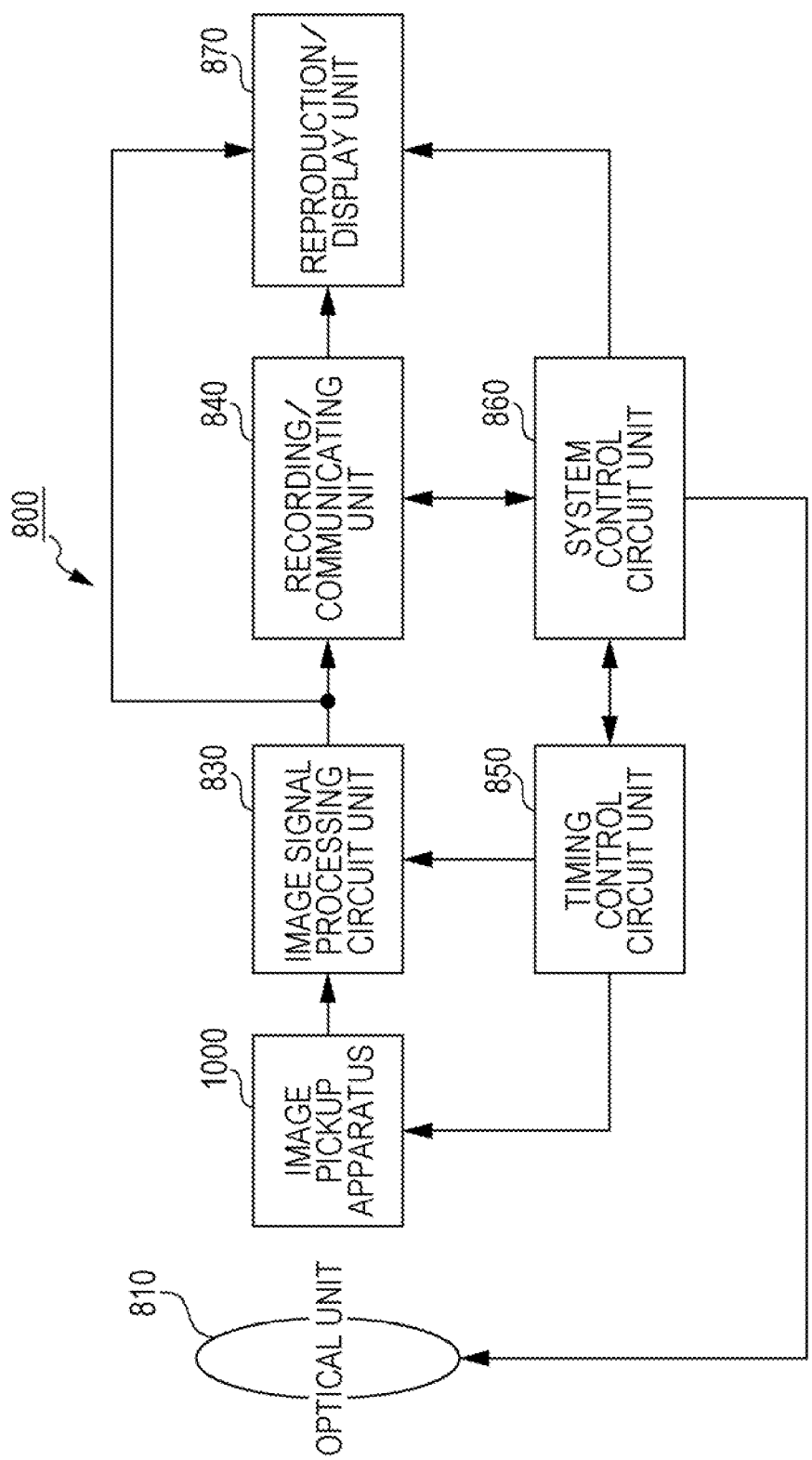

IMAGE PICKUP APPARATUS, IMAGE PICKUP SYSTEM, AND DRIVING METHOD OF IMAGE PICKUP APPARATUS

BACKGROUND OF THE INVENTION

1. Field of the Invention

The present invention relates to an image pickup apparatus, an image pickup system, and a driving method of an image pickup apparatus.

2. Description of the Related Art

As an image pickup apparatus used for an electronic video camera and an electronic still camera, an image pickup apparatus called an X-Y addressing-type sensor is known. In the X-Y addressing-type sensor, a signal can be obtained from a pixel at a specific position by specifying an address. By this feature, in the X-Y addressing-type sensor, it is possible to realize an all-pixel read mode in which signals are obtained from all the pixels, a thinning-out read mode in which a part of rows or columns are skipped and signals are obtained from the other pixels, and the like.

Japanese Patent Laid-Open No. 2000-350103 describes that in a thinning-out read mode, pixels in a row from which signals are not read, in other words, pixels in a skipped row are fixed to a reset state at all times.

Japanese Patent Laid-Open No. 2008-288903 describes that a first storage means for storing an address of a row in which a shutter scan is performed and a second storage means for storing an address of a row in which a read scan is performed are provided in order to perform a complex shutter operation in a thinning-out read mode. Also a pixel sharing technique is described in which a floating diffusion portion, which temporarily holds a charge accumulated in each pixel, is shared by a plurality of pixels, and further, a circuit for selecting a pixel at that time is described.

In Japanese Patent Laid-Open No. 2000-350103, a row to be thinned out is fixed. Hence, it is difficult to freely change the row to be thinned out.

According to the technique of Japanese Patent Laid-Open No. 2008-288903, a row to be thinned out can be freely set because a decoder is used. However, Japanese Patent Laid-Open No. 2008-288903 only has the first storage means for storing an address of a row in which the shutter scan is performed and the second storage means for storing an address of a row in which the read scan is performed, so that the row to be thinned out cannot be always held in a reset state.

SUMMARY OF THE INVENTION

In view of the above problems, the present invention provides an image pickup apparatus, an image pickup system, and a driving method of an image pickup apparatus that can set a row from which signal is read and a shutter row while fixing photoelectric conversion units in a row to be thinned out to a reset state.

An aspect of the present invention that solves the above problems is an image pickup apparatus which includes a pixel array in which pixels are arranged in a plurality of rows and columns, each pixel including a photoelectric conversion unit and a row selection unit configured to select a row in the pixel array, wherein the row selection unit includes an address generation unit configured to generate an address signal corresponding to an address of a row in the pixel array by a time division multiplexing, a decoder configured to decode the address signal generated by the address generation unit and output a corresponding decode value, a first storage unit configured to store the decode value corresponding to an address of a row, from which signal is read, in the pixel array, and a second storage unit configured to store the decode value corresponding to an address of a row, on which initialization is performed, in the pixel array, and the row selection unit further includes a third storage unit configured to store the decode value corresponding to an address of a row, in which a potential of the photoelectric conversion unit is fixed, in the pixel array.

Another aspect of the present invention that solves the above problems is a driving method of an image pickup apparatus, which includes a pixel array in which pixels are arranged in a plurality of rows and columns, each pixel including a photoelectric conversion unit and a row selection unit configured to select a row in the pixel array, wherein the row selection unit includes an address generation unit configured to generate an address signal corresponding to an address of a row in the pixel array by a time division multiplexing, a decoder configured to decode the address signal generated by the address generation unit and output a corresponding decode value, a first storage unit configured to store the decode value corresponding to an address of a row, from which signal is read, in the pixel array, and a second storage unit configured to store the decode value corresponding to an address of a row, on which initialization is performed, in the pixel array, and the row selection unit further includes a third storage unit configured to store the decode value corresponding to an address of a row, in which a potential of the photoelectric conversion unit is fixed, in the pixel array, and performs a shutter scan on the row stored in the second storage unit during a period in which potential of the row stored in the third storage unit is fixed.

According to the present invention, it is possible to set a row from which signal is read and a shutter row while fixing photoelectric conversion units in a row to be thinned out to a reset state.

Further features of the present invention will become apparent from the following description of exemplary embodiments with reference to the attached drawings.

BRIEF DESCRIPTION OF THE DRAWINGS

FIG. 10 is a block diagram showing an outline of an image pickup system according to a fifth embodiment.

DESCRIPTION OF THE EMBODIMENTS

First Embodiment

A first embodiment according to the present invention will be described with reference to the drawings.

Figure 1:
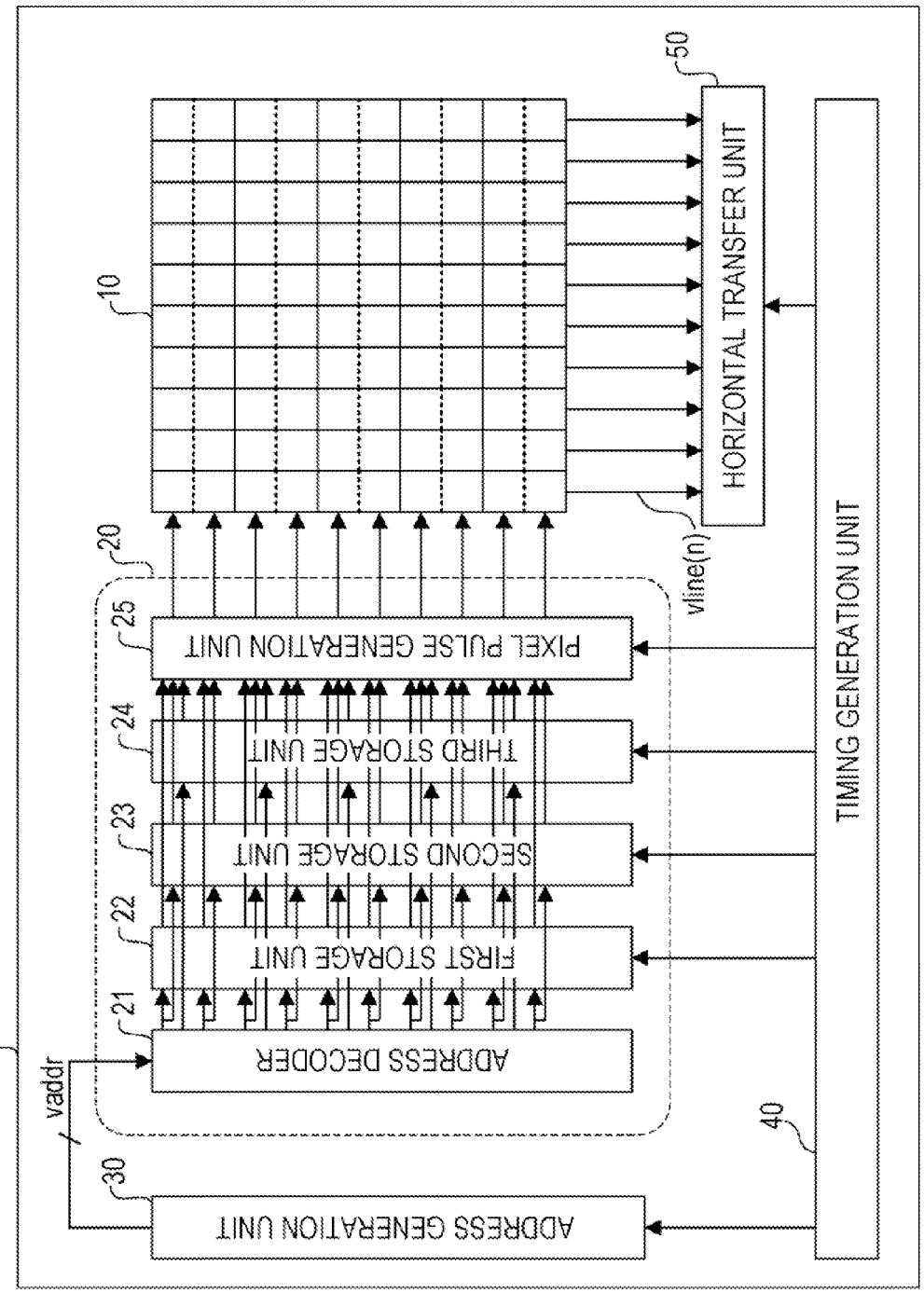
FIG. 1 is a block diagram showing an outline of an image pickup apparatus according to the present invention.

FIG. 1 is a block diagram showing a schematic configuration of an image pickup apparatus according to the present invention. The image pickup apparatus 1 includes a pixel array 10, a row selection unit 20, an address generation unit 30, a timing generation unit 40, and a horizontal transfer unit 50. All of these components may be formed on the same semiconductor substrate or a part of these components may be formed on a different semiconductor substrate.

In the pixel array 10, pixels are arranged in a plurality of rows and columns, and a circuit is shared between pixels in rows adjacent to each other. Hereinafter, a plurality of pixels that share a circuit with each other is referred to as a pixel block. In other words, the pixel array 10 is an arrangement in which a plurality of pixel blocks are arranged in a matrix form.

The row selection unit 20 is disposed adjacent to the pixel array 10 and selects pixels in the pixel array 10 by one row at a time.

The row selection unit 20 further includes an address decoder 21, a first storage unit 22, a second storage unit 23, a third storage unit 24, and a pixel pulse generation unit 25. The address decoder 21 outputs a decode value obtained by decoding an address value generated by the address generation unit 30, and selects an address corresponding to the address value.

The first storage unit 22 stores the decode value outputted from the address decoder 21 and an output from the first storage unit is used as an address of a row in which signals are read from pixels in the pixel array 10.

The second storage unit 23 stores the decode value outputted from the address decoder 21 and an output from the second storage unit is used as an address of a row in which photoelectric conversion units included in pixels are reset in the pixel array 10.

The third storage unit 24 stores the decode value outputted from the address decoder 21 and an output from the third storage unit is used to control an element shared by a plurality of pixels in a pixel block in the pixel array 10.

The address generation unit 30 generates an address value based on a signal provided from the timing generation unit 40 and provides the address value to the row selection unit 20. The address generation unit 30 outputs an address signal vaddr by a time division multiplexing, so that one address decoder can select a plurality of addresses. More specifically, a configuration is possible in which the address generation unit has a plurality of circuits that generate an address value and selects an output from one of the circuits based on the signal from the timing generation unit 40 to output the selected output as the address signal vaddr.

The timing generation unit 40 provides a signal for controlling the timing at which the address generation unit 30 generates an address value as well as a signal for controlling an operation timing of the row selection unit 20 and the horizontal transfer unit 50.

The horizontal transfer unit 50 is a circuit for outputting a signal read from the pixel array 10 via a vertical signal line vline (n) from an output terminal out. Specifically, the horizontal transfer unit 50 includes amplifiers, AD converters, CDS circuits, line memory circuits, and the like that are provided for each vertical signal line vline (n), and sequentially outputs the signals from the output terminal out by a horizontal scanning circuit. The line memory circuit may be an analog memory or a digital memory including SRAM and latch circuit.

An arbitrary column may be accessed when the horizontal scanning circuit comprises a decoder. In this way, random access can be realized by a combination with the row selection unit 20. Needless to say, even when the row selection unit and the horizontal scanning circuit are decoders, scanning can be sequentially performed in an order of addresses.

Figure 2:
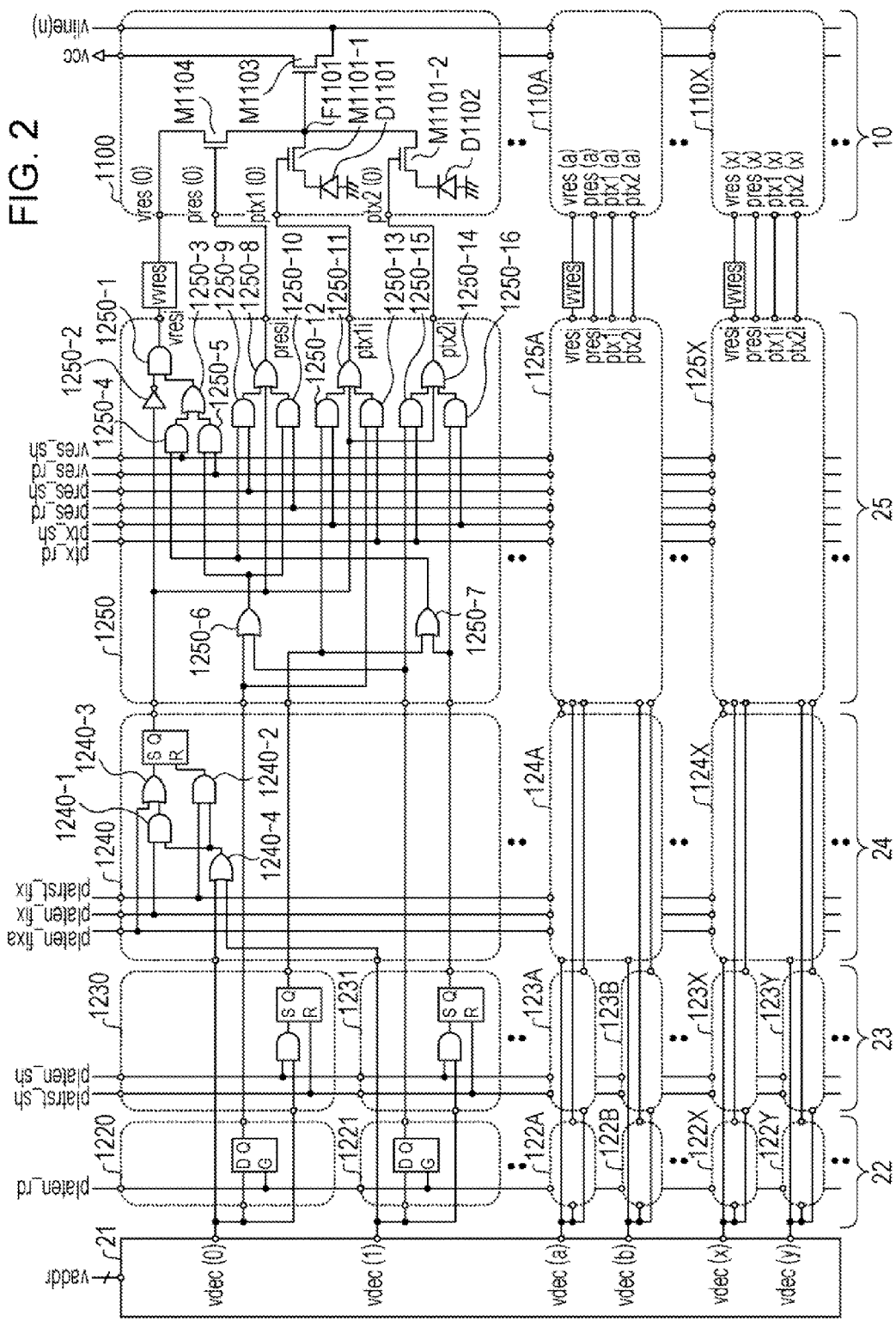
FIG. 2 is a circuit diagram showing a configuration example of an image pickup apparatus according to a first embodiment.

FIG. 2 is a circuit diagram in which portions except for the timing generation unit 40 and the horizontal transfer unit 50 are extracted from the configuration shown in FIG. 1 and shown in further detail.

In the pixel array 10, a plurality of pixel blocks 1100, . . . 110A, . . . 110X are arranged, and in FIG. 2, pixel blocks of 6 rows by 1 column are extracted from the plurality of pixel blocks. The pixel block 1100 includes 2 pixels. A pixel in a first row includes a photodiode D1101 that is a photoelectric conversion unit, a transfer transistor M1101-1, an amplifying transistor M1103, and a reset transistor M1104 that is a reset unit. When the transfer transistor M1101-1 turns on, a charge stored in the photodiode D1101 is transferred to a node of the gate of the amplifying transistor M1103. Although not shown in FIG. 2, the gate of the amplifying transistor M1103 is connected to a floating diffusion portion that also works as one main electrode of the transfer transistor M1101-1 on a semiconductor substrate, and the charge from the photodiode is transferred to the floating diffusion portion. Hereinafter, the floating diffusion portion is referred to as FD portion. In the amplifying transistor M1103, one main electrode receives a supply of a power source voltage vcc, and the other main electrode is connected to the vertical signal line vline (n) via a selection transistor M1105. When the node of the gate of the amplifying transistor M1103 is set to an operation voltage by the reset transistor M1104, a source follower circuit is formed by the amplifying transistor M1103 and a constant current source (not shown in FIG. 2) connected to the vertical signal line vline (n), and the amplifying transistor M1103 outputs a signal in accordance with a potential of the FD portion. One main electrode of the reset transistor M1104 is connected to the FD portion, and when the reset transistor M1104 turns on, the reset transistor M1104 resets the FD portion in accordance with a voltage supplied to the other main electrode. A pixel in a second row includes a photodiode D1102, a transfer transistor M1101-2, the amplifying transistor M1103 that is a pixel output unit, the reset transistor M1104 that is a reset unit, and the selection transistor M1105. These two pixels share the amplifying transistor M1103 and the reset transistor M1104. In the same way as in the pixel block 1100, in the pixel blocks 1101, 1102, and so on, pixels in two rows adjacent to each other share the amplifying transistor M1103 and the reset transistor M1104.

The address signal vaddr outputted from the address generation unit 30 based on a control signal from the timing generation unit 40 is inputted into the address decoder 21. The address signal vaddr is a signal corresponding to the number of rows of the pixels, and corresponds to 0 to X in this embodiment. When "0" is provided as the address signal vaddr from the address generation unit to the address decoder, the address decoder outputs a logical High level for only a decode value vdec (0), and outputs logical Low level for the other decode values. This is the same when the address signal vaddr is 1, 2, . . . , A, . . . , X.

A plurality of first storage circuits 1220, 1221, and so on, which are included in the first storage unit 22, respectively include a D latch that stores 1-bit data. The D terminal of the D latch included in the first storage circuit 1220 is connected to the output vdec (0) of the address decoder 21, and the G terminal is connected to a line that transmits a signal platen_rd. In the same way as the first storage circuit 1220, the first storage circuits 1221, 1222, and so on include a D latch, however, the D terminal is connected to a different output of the address decoder 21. The line that transmits the signal platen_rd is also connected to the other storage circuits 1221, 1222, and so on in the first storage unit.

The second storage circuits 1230, 1231, and so on, which are included in the second storage unit 23, include an AND circuit and an SR latch whose S terminal is connected to the output of the AND circuit. One input terminal of the AND circuit is connected to the output vdec (0) of the address decoder 21, and the other input terminal is connected to a line that transmits a signal platen_sh. The R terminal of the SR latch is connected to a line that transmits a signal platrst_sh. The line that transmits the signal platrst_sh is also connected to the other second storage circuits 1231, 1232, and so on in the second storage unit.

The third storage circuits 1240, 1241, and so on, which are included in the third storage unit 24, include an SR latch, AND circuits, and OR circuits. One input terminal of the AND circuit 1240-1 is connected to a line that transmits a signal platen_fix, and the other input terminal is connected the output terminal of the OR circuit 1240-4. One input terminal of the AND circuit 1240-2 is connected to a line that transmits a signal platrst_fix, and the other input terminal is connected the output terminal of the OR circuit 1240-4. Further, the output terminal of the AND circuit 1240-2 is connected to the R terminal of the SR latch. One input terminal of the OR circuit 1240-3 is connected to a line that transmits a signal platen_fixa, and the other input terminal is connected the output terminal of the AND circuit 1240-1. Further, the output terminal of the OR circuit 1240-3 is connected to the S terminal of the SR latch. One input terminal of the OR circuit 1240-4 is connected to the output terminal vdec (0) of the address decoder 21, and the other input terminal is connected to the output terminal vdec (1) of the address decoder 21.

Although an arbitrary configuration is shown in which pixel pulse generation circuits 1250, 1251, and so on which are included in the pixel pulse generation unit 25 are formed by using AND circuits, OR circuits, and a NOT circuit, the configuration of the circuits is not limited to the configuration of this example. The pixel pulse generation circuit 1250 outputs signals vresi, presi, ptx1*i*, and ptx2*i*, and the signals vresi, presi, ptx1*i*, and ptx2*i* are provided to the pixel block 1100 as vres(0), pres(0), ptx1(0), and ptx2(0) of the pixel block 1100 respectively.

The signal vresi appears as an output of the AND circuit 1250-1. One input terminal of the AND circuit 1250-1 receives a signal which is an output of the SR latch of the third storage circuit inverted by the NOT circuit 1250-2, and the other input terminal receives an output from the OR circuit 1250-3. One input terminal of the OR circuit 1250-3 is connected to the output terminal of the AND circuit 1250-4, and the other input terminal is connected to the output terminal of the AND circuit 1250-5. One input terminal of the AND circuit 1250-4 is connected to the output terminal of the OR circuit 1250-7 which outputs a logical OR of outputs of the second storage circuits 1230 and 1231, and the other input terminal is connected to a line that transmits a signal vres_sh. One input terminal of the AND circuit 1250-5 is connected to the output terminal of the OR circuit 1250-6 which outputs a logical OR of outputs of the first storage circuits 1220 and 1221, and the other input terminal is connected to a line that transmits a signal vres_rd. The signal vresi is inputted into a power supply unit vvres which supplies a voltage signal to the drain terminal of the reset transistor M1104 in the pixel block 1100. The power supply unit vvres is configured to output voltage signals corresponding to High level and Low level of the signal vresi. The voltage signal outputted from the power supply unit vvres need not have the same voltage as that indicated by the logic level of the signal vresi. The voltage signal can instead be set to a voltage different from the voltage of the logic level of the signal vresi. Although an example is shown in which the power supply unit vvres is provided, a configuration is possible in which the signal vresi is directly provided to the drain terminal of the reset transistor M1104. The advantage of providing the power supply unit vvres is that the vres (0) can be set to a voltage different from High level or Low level of the AND circuit 1250-1.

The signal presi appears as an output of the OR circuit 1250-8 having three inputs. The OR circuit 1250-8 outputs a logical OR of the output of the AND circuit 1250-9, the output of the third storage circuit 1240, and the output of the AND circuit 1250-10. The AND circuit 1250-9 outputs a logical AND of the output of the OR circuit 1250-7 and the signal pres_sh. The AND circuit 1250-10 outputs a logical AND of the output of the OR circuit 1250-6 and the signal pres_rd.

The signal ptx1*i* appears as an output of the OR circuit 1250-11 having three inputs. The OR circuit 1250-11 outputs a logical OR of the output of the AND circuit 1250-12, the output of the third storage circuit 1240, and the output of the AND circuit 1250-13. The AND circuit 1250-12 outputs a logical AND of the output of the second storage circuit 1230 and the signal ptx_sh. The AND circuit 1250-13 outputs a logical AND of the output of the first storage circuit 1220 and the signal ptx_rd.

The signal ptx2*i* appears as an output of the OR circuit 1250-14 having three inputs. The OR circuit 1250-14 outputs a logical OR of the output of the AND circuit 1250-15, the output of the third storage circuit 1240, and the output of the AND circuit 1250-16. The AND circuit 1250-15 outputs a logical AND of the output of the first storage circuit 1221 and the signal ptx_rd. The AND circuit 1250-16 outputs a logical AND of the output of the second storage circuit 1231 and the signal ptx_sh.

The signals platen_rd, platen_sh, platrst_sh, platrst_fix, platen_fix, platen_fixa, vres_sh, vres_rd, ptx_rd, ptx_sh, pres_rd, and pres_sh are generated by the timing generation unit 40.

Figure 3A:
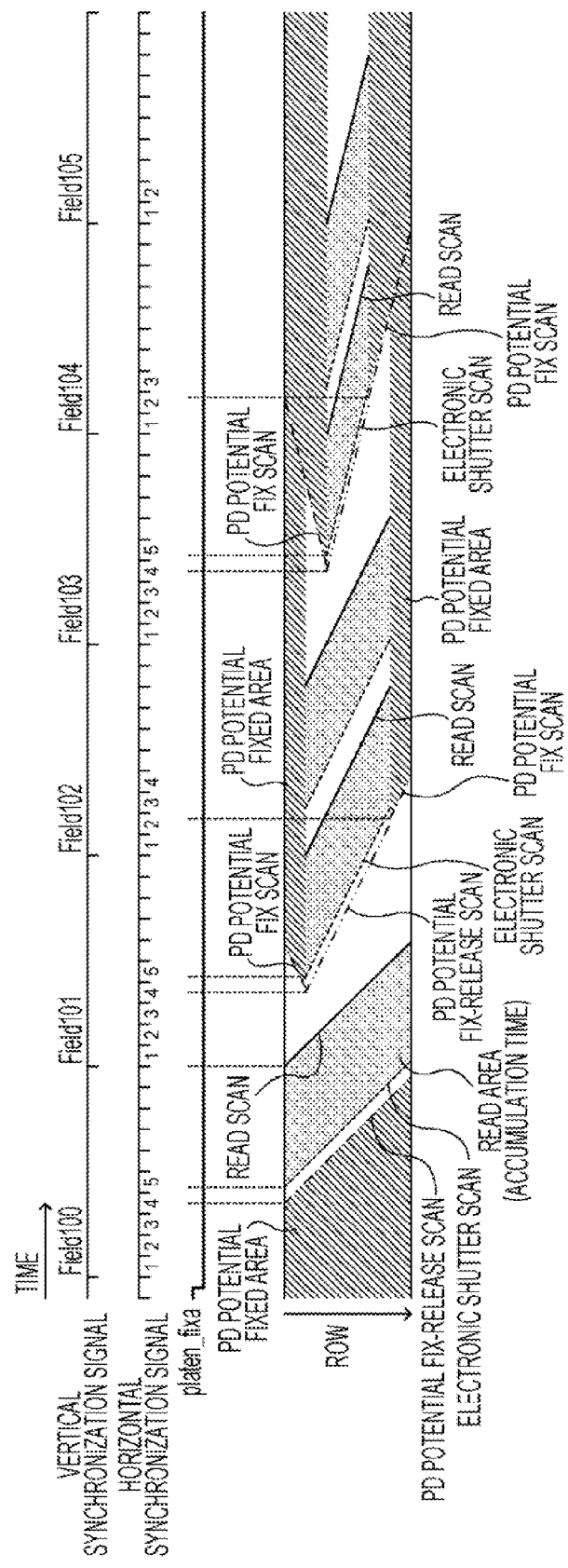
FIG. 3 is a timing chart showing an outline of operation of the image pickup apparatus according to the first embodiment.

Next, an outline of an operation to which the present invention can be applied will be described with reference to FIG. 3. FIG. 3A shows a zoom-in operation which reduces an area from which signal is read as the field progresses. When a vertical synchronization signal is inputted into the timing generation unit 40 from an external unit not shown in FIG. 3, an operation in each field is started, and when a horizontal synchronization signal is inputted into the timing generation unit 40 from an external unit not shown in FIG. 3, an operation related to each row is performed. "Read Area" in FIG. 3 indicates that signals are read from pixels in the area, and "PD Potential Fixed Area" indicates that the potentials of photodiodes of pixels in the area are held at a certain potential.

Here, before the Field 100, potentials of PDs of all pixels are fixed, and a scan is performed on the Field 100 to release the state in which potentials are fixed. Thereafter, an electronic shutter scan on a read row is performed, and accumulation time starts. After a predetermined accumulation time has elapsed, a read scan is performed. To fix the PD potentials of all pixels, in FIG. 2, the signal platen_fixa is set to High level.

From Field 101, an area smaller than Field 100 is set as a read area, and an area from which no signal is read is controlled as a PD potential fixed area.

Thereafter, from Field 103, by setting a further smaller area as the read area, the zoom-in operation is performed.

Figure 3B:
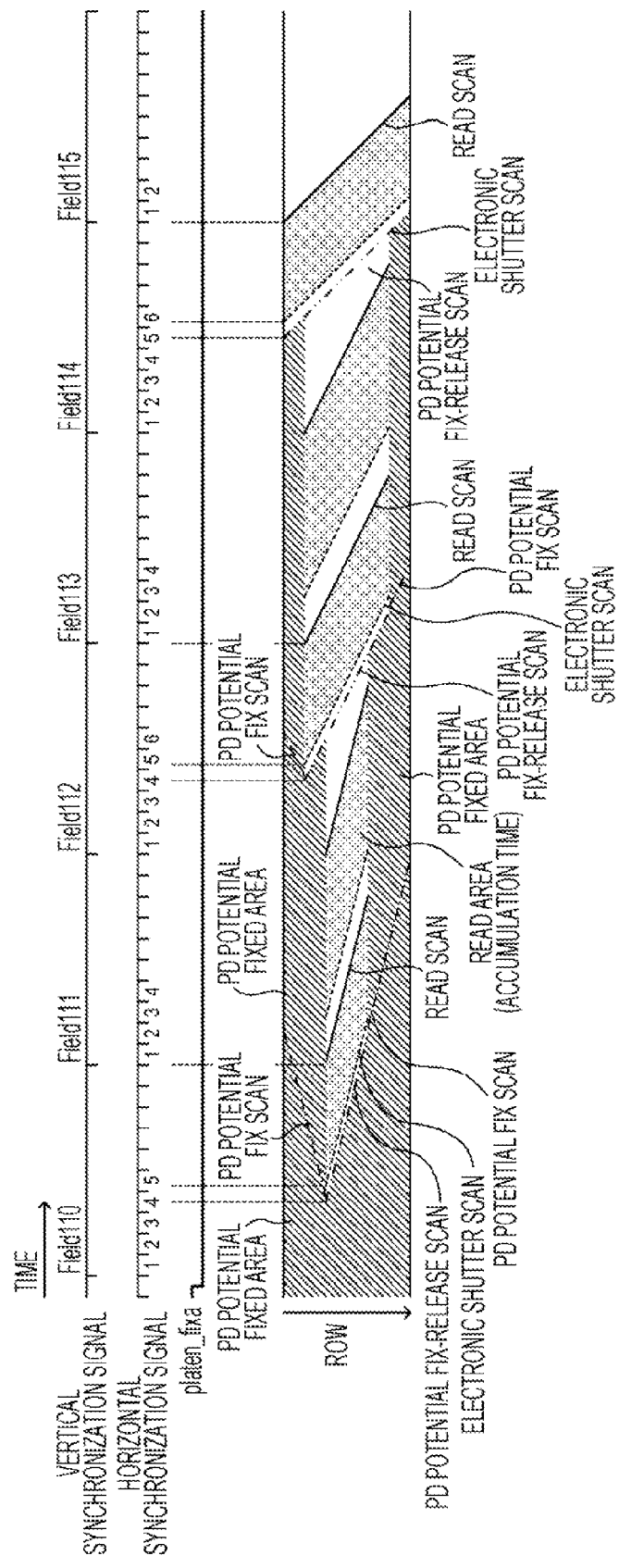

On the other hand, FIG. 3B shows a zoom-out operation which enlarges an area from which signal is read as the field progresses. Also in the zoom-out operation, areas other than the read area are set as the PD potential fixed area.

In this way, potentials of PDs in a row from which no signal is read are fixed, so that the row is not driven in a way that an electronic shutter row is driven, and thus noises and power consumption caused by the shutter scan can be reduced.

Further, according to the operation shown in FIG. 3, the PD potential fix-release scan and the PD potential fix scan are performed in synchronization with the electronic shutter scan, so changes of read areas in the zoom-in operation and the zoom-out operation can be performed continuously and seamlessly.

Generally, OB (Optical Black) pixels in which PD is shielded from light are provided in a pixel array. For example, in FIG. 1, some rows from the top of the pixel array 10 may be set as OB pixels. An operation related to the OB pixels are not shown in FIG. 3 for simplicity of explanation. In a case where the OB pixels are provided in the pixel array 10, the operation is performed so that the start time of read scan of read area is immediately after the end time of read scan of the OB pixels.

Under such a condition, it is effective to perform the PD potential fix scan in a direction opposite to the scanning direction of the electronic shutter scan and the read scan. This is because, accumulation time of the pixels in the adjacent PD potential fixed area can be close to that of the OB pixels adjacent to the PD potential fixed area and the pixels in the read area, and influence from the pixels in the PD potential fixed area can be close between the OB pixels and the pixels in the read area. In other words, in a cut-out operation, a read scan performed based on an address stored in the first storage unit is performed in a first direction (from top to bottom in FIG. 3). Non-read rows located above the start row of read scan, that is, non-read rows located on the side different from the first direction of the start row of read scan are scanned in a second direction different from the first direction by a scan operation for fixing the potentials of PDs based on an address stored in the third storage unit. Non-read rows located below the end row of read scan, that is, non-read rows located on the side of the first direction of the end row of read scan are scanned by a scan operation in the first direction for fixing the potentials of PDs based on an address stored in the third storage unit.

At the timing when the fourth horizontal synchronization signal in Field 102 in FIG. 3 is inputted, a control for maintaining the potentials of photodiodes in the PD potential fixed area at a certain potential and the electronic shatter scan on Field 102 are performed in addition to the read scan of the read area in which accumulation is started in Field 101. In this way, a situation may occur where three controls are required for a plurality of pixels included in the image pickup apparatus. However, conventional technique only has the storage unit for storing the address of read row and the storage unit for storing the address of electronic shutter row. Hence, it is impossible to perform a plurality types of reset operations.

On the other hand, the present invention realizes an operation different from the operation of electronic shutter row by providing the third storage unit for storing the address of row in which the potentials of PDs are fixed.

Figure 4:
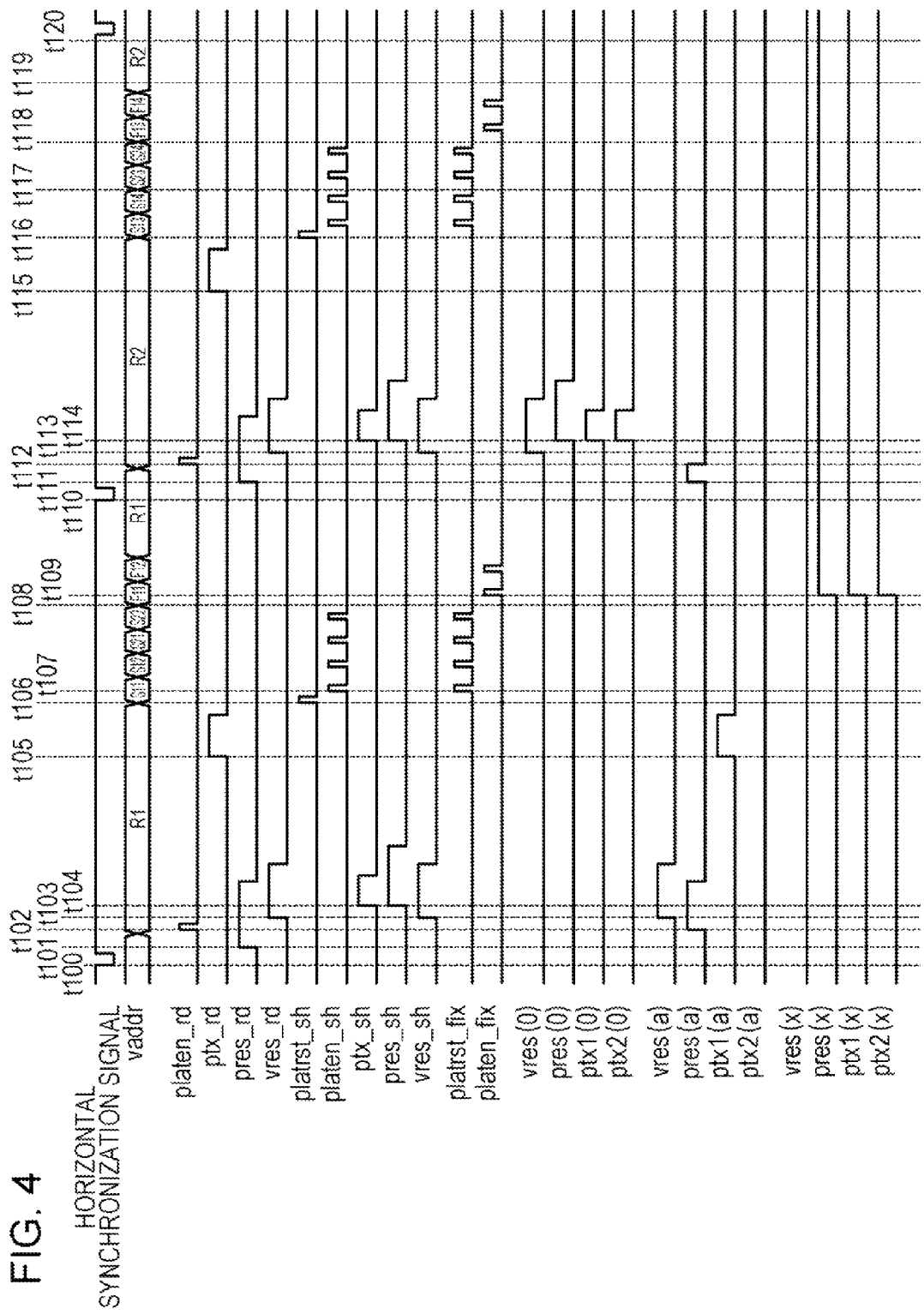
FIG. 4 is a timing chart showing the operation of the image pickup apparatus according to the first embodiment.

Next, further detailed operation of the image pickup apparatus 1 shown in FIGS. 1 and 2 will be described with reference to a timing chart shown in FIG. 4.

Here, an example will be described in which signal is read from the pixel in row A in the pixel array 10, then potentials of photodiodes of the pixels in row X and row Y are fixed, and further a shutter operation on the pixels in a total of 4 rows including row 0 and row 1 is performed. The shutter operation is an operation for resetting the photodiodes, and also referred to as initialization of pixels. At time t100 in FIG. 4, the D latch of the first storage unit 22 and the SR latches of the second storage unit 23 and the third storage unit 24 hold Low level.

First, when the horizontal synchronization signal is inputted into the timing generation unit 40 from an external unit not shown in the figures at time t100, the timing generation unit 40 sets the signal pres_rd to High level at time t101. At this time, the signal vres_rd is Low level, so that pixels in a row from which signals are read during a horizontal synchronization period before the horizontal synchronization period beginning from the time t100 become a non-selected state. The horizontal synchronization signal is a signal that defines the horizontal synchronization period in which signal of the pixel in a row is read.

The address signal vaddr at time t102 indicates R1="a", so that only the vdec (a) of the outputs of the address decoder 21 becomes High level. When the signal platen_rd temporarily becomes High level from time t102, only the output of D latch of the first storage circuit 122A in ath row becomes High level. At time t102, the signal pres_rd is also High level, so that the OR circuit 1250-10 of the pixel pulse generation unit 125A becomes High level, the signal pres (a) becomes High level, and the reset transistor M1104 in the pixel block 110A turns on.

When the signal vres_rd becomes High level at time t103, the output of the AND circuit 1250-1 becomes High level. Thereby, the FD portion F1101 in the pixel block 110A including pixels of ath row is reset to a high potential, and the pixel block becomes a selected state. The selected state means a state in which the amplifying transistor M1103 and a constant current source (not shown in the figures) provided on the vertical signal line vline (n) form a source follower and a signal corresponding to the potential of the FD portion F1101 appears on the vertical signal line vline (n). The signal that appears on the vertical signal line vline (n) at time t103 is a signal corresponding to the reset of the FD portion F1101 in the pixel block 110A, and this signal includes a noise component caused by the reset transistor M1104, the amplifying transistor M1103, and the FD portion F1101. Thereafter, if the horizontal transfer unit 50 includes a CDS circuit, after the signal pres_rd changes to Low level, an output that appears on the vertical signal line vline (n) during this period is sampled.

At time t104, although the signals ptx_sh and pres_sh become High level, the SR latches of the second storage unit 23 and the third storage unit 24 hold Low level, therefore the AND circuits 1250-12 and 1250-9 are still Low level.

When the signal ptx_rd becomes High level at time t105, the AND circuit 1250-13 becomes High level by the logical AND of the signal ptx_rd and the output of D latch of the first storage circuit 122A, and only the signal ptx1 (a) becomes High level. Thereby, when the charge held by the PD in the ath row is transferred to the FD portion F1101 via the transfer transistor M1101-1, the potential of the FD portion F1101 changes according to the amount of the transferred charge, and accordingly the signal that appears on the vertical signal line vline (n) changes. The signal at this time has changed by an amount corresponding to the amount of charge generated by photoelectric conversion with respect to the level immediately after resetting the FD portion F1101, so it is possible to reduce noise component by calculating a difference between the level of the signal and the noise component held by the CDS circuit. By the operation described above, the operation for reading a signal from the pixel in the first row is completed.

In the period from time t106 to time t108, an operation for storing shutter row addresses of a total of 4 rows including pixels in the zeroth row and the first row into the second storage circuit is performed, and the third storage circuits related to these rows are reset.

At time t106, the address signal vaddr changes to S11 and the signal platrst_sh temporarily becomes High level. Thereby, the SR latches of each storage circuit in the second storage unit are reset. The S11 at this time indicates "0".

When the signal platen_sh becomes High level at time t107, the SR latch of the second storage circuit related to the pixel in the zeroth row indicated by S11 is set, and the output of the SR latch changes to High level. At time t107, the signal platrst_fix becomes High level, so the SR latch of the third storage circuit related to the pixel in the zeroth row is reset. In short, the operation for writing an address to the second storage unit and the operation for resetting the third storage unit are performed at the same time on the same row.

Thereafter, the address signal changes to S12 to S21 to S22, and the same operation as that when the address signal is S11 is performed. Here, S12 is a value corresponding to "1", and S21 and S22 are values corresponding to other two rows.

From time t108, an operation for setting the SR latch of the third storage circuit related to a row in which potential of the PD is fixed is performed. At time t108, the address signal vaddr changes to F11. Here, the F11 indicates "x".

When the signal platen_fix becomes High level at time t109, the SR latch of the third storage circuit 124X is set, and the output of the SR latch changes to High level. When the SR latch of the third storage circuit 124X outputs High level, signals presi, ptx1$i$, and ptx2$i$ of the outputs of the corresponding pixel pulse generation unit 125X become High level. Thereby, the reset transistor M1104 and the transfer transistors M1101-1 and M1101-2 in the pixel block 110X turn on. Here, a voltage supplied to the drain terminal of the reset transistor M1104 is Low level, so that the photodiodes D1101 and D1102 in the pixel block 110X are held at low potential.

Similarly, the address signal vaddr changes to F12 and the SR latch of the third storage circuit 124X of the corresponding row is set. Here, the F12 is "y", so, in the same way as when the address signal is F11, the SR latch of the third storage circuit 124X is set. Therefore, the states of the signals pres(x), ptx1($x$), and ptx2($x$) do not change from time t109.

At time t110, the vertical synchronization signal is inputted and an operation related to the next row is performed.

When the signal pres_rd becomes High level at time till, a High level signal presi is outputted from the pixel pulse generation unit 125A related to the ath row set as a read row at time t103. Thus, the signal pres (a) provided to the reset transistor M1104 in the pixel block 110A becomes High level, and the FD portion F1101 in the pixel block 110A is reset to a low potential and becomes the non-selected state.

Thereafter, when the address signal vaddr changes to R2, only the vdec (b) of the outputs of the address decoder 21 becomes High level. Here, the R2 indicates "b". When the signal platen_rd temporarily becomes High level at time t112, only the output of D latch of the first storage circuit 122A in (a+1)th row becomes High level. At time t112, the signal pres_rd is also High level, so the signal pres (a) becomes High level and the reset transistor M1104 in the pixel block 110A turns on.

When the signal vres_rd becomes High level at time t113, the output of the AND circuit 1250-1 becomes High level. Thereby, the FD portion F1101 in the pixel block 110A including pixels of bth row is reset to a high potential, and the pixel block becomes the selected state. The signal that appears on the vertical signal line vline (n) at time t113 is a signal corresponding to the reset of the FD portion F1101 in the pixel block 110A. This signal includes a noise component caused by the reset transistor M1104, the amplifying transistor M1103, and the FD portion F1101. Thereafter, if the horizontal transfer unit 50 includes a CDS circuit, after the signal pres_rd changes to Low level, an output that appears on the vertical signal line vline (n) during this period is sampled.

At time t114, the signals ptx_sh and pres_sh become High level. Here, rows related to S11, S12, S21, and S22 of the SR latches of the second storage unit 23, in other words, only the second storage unit 23 corresponding to a total of 4 rows including the zeroth row and the first row outputs High level. Thereby, the signals pres(0), ptx1(0), ptx2(0), and the like corresponding to these rows become High level. In a period when the signal vres_sh is High level, the photodiodes of the 4 rows are reset to a high potential, and thereafter, after the signal vres_sh changes to Low level, the signal pres_sh changes to Low level. Thereby, the pixel blocks which include pixels of the 4 rows in which the photodiode is reset become the non-selected state. In this way, in the period beginning from time t114, the signals pres_rd, vres_rd, ptx_sh, pres_sh, and vres_sh become High level at the same time. Thereby, the initialization of the FD portion of the pixel from which signal is read based on the first storage unit and the initialization of the pixel selected based on the second storage unit are performed at the same time.

The operation after time t115 is the same as the operation after time t105 described above except for the value of the address signal vaddr, so the description will be omitted.

Although an example is shown in which the address signal vaddr is set to R1 in the period after the address signal vaddr is set to F12 and before the operation related to the next line is started, the address signal vaddr may be set to a value other than R1 because the address signal vaddr is not held in any storage circuit in this period.

As described above, according to this embodiment, it is possible to set a plurality of methods for resetting the photodiode in a row in which signal is not read from pixel. Thereby, in a row in which the second storage circuit is set in the period from time t107 to time t109, the PD is temporarily reset in the next horizontal synchronization period. On the other hand, in a row in which the third storage circuit is set in the period from time t109, the PD is held in a reset state.

Second Embodiment

Figure 5:
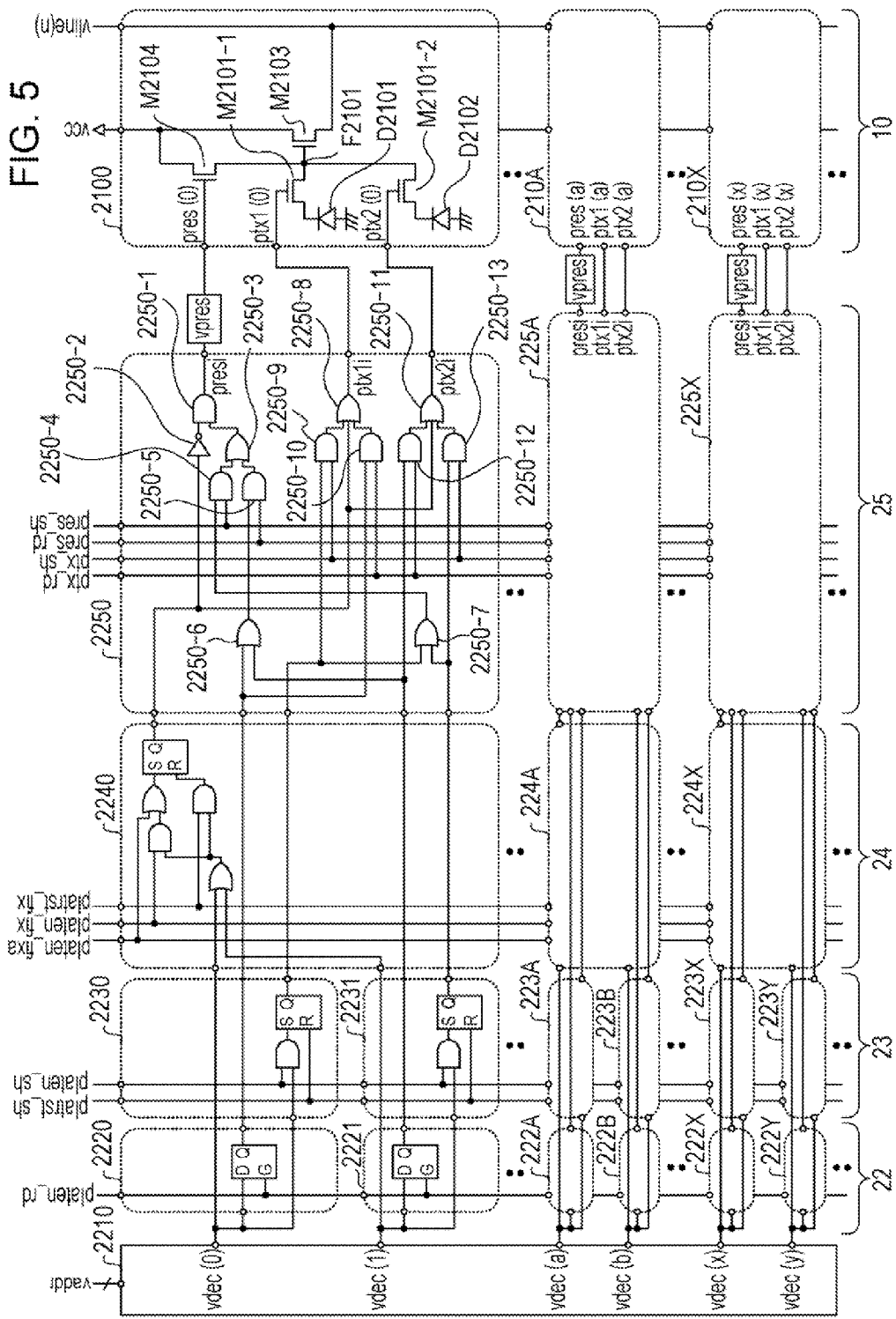
FIG. 5 is a circuit diagram showing a configuration example of an image pickup apparatus according to a second embodiment.

A second embodiment according to the present invention will be described with reference to the drawings. FIG. 5 is a circuit diagram in which portions except for the timing generation unit 40 and the horizontal transfer unit 50 are extracted from the configuration shown in FIG. 1 and shown in further detail. Hereinafter, differences from the first embodiment will be mainly described.

In the first embodiment, the drain terminal of the reset transistor and the drain terminal of the amplifying transistor in each pixel block are supplied with power sources different from each other. On the other hand, in a configuration according to this embodiment shown in FIG. 5, the drain terminal of the reset transistor and the drain terminal of the amplifying transistor in each pixel block are connected to each other and provided with a common power source. According to this configuration, the number of lines necessary to control pixels is smaller than that of the configuration of the first embodiment, so this is advantageous for reducing the size of the image pickup apparatus.

Since the configuration of the pixel block is changed, the configuration of the pixel pulse generation unit 25 is also changed from that of the first embodiment. In FIG. 5, an exemplary configuration is shown in which the pixel pulse generation circuits 2250, 2251, and so on are formed by using AND circuits, OR circuits, and NOT circuits. The pixel pulse generation circuit 2250 outputs signals presi, ptx1$i$, and ptx2$i$, and the signals presi, ptx1$i$, and ptx2$i$ are provided to the pixel block 2100 as pres(0), ptx1(0), and ptx2(0) of the pixel block 2100 respectively.

The signal presi appears as an output of the AND circuit 2250-1. The AND circuit 2250-1 outputs a logical AND of the output of the NOT circuit 2250-2 and the output of the OR circuit 2250-3. The NOT circuit 2250-2 outputs an inverted signal of the output of the third storage circuit 2240. The OR circuit 2250-3 outputs a logical OR of the output of the AND circuit 2250-4 and the output of the AND circuit 2250-5. The AND circuit 2250-4 outputs a logical AND of the signal pres_sh and the output of the OR circuit 2250-7. The AND circuit 2250-5 outputs a logical AND of the signal pres_rd and the output of the OR circuit 2250-6. The OR circuit 2250-6 outputs a logical OR of the outputs of the first storage circuits 2220 and 2221 and the OR circuit 2250-7 outputs a logical OR of the outputs of the second storage circuits 2230 and 2231. The signal presi is provided to the reset gate control unit vpres. The reset gate control unit vpres provides a signal corresponding to the logic level of the signal presi to the pixel block as pres (n) (n indicates a given row). The reset gate control unit may be omitted and the signal presi may be directly provided to the pixel block as a signal pres (n).

The signal ptx1$i$ appears as an output of the OR circuit 2250-8 having three inputs. The OR circuit 2250-8 outputs a logical OR of the output of the AND circuit 2250-9, the output of the third storage circuit 2240, and the output of the AND circuit 2250-10. The AND circuit 2250-9 outputs a logical AND of the output of the second storage circuit 2230 and the signal ptx_sh. The AND circuit 2250-10 outputs a logical AND of the output of the first storage circuit 2220 and the signal ptx_rd.

The signal ptx2$i$ appears as an output of the OR circuit 2250-11 having three inputs. The OR circuit 2250-11 outputs a logical OR of the output of the AND circuit 2250-12, the output of the third storage circuit 2240, and the output of the AND circuit 2250-13. The AND circuit 2250-12 outputs a logical AND of the output of the first storage circuit 2221 and the signal ptx_rd. The AND circuit 2250-13 outputs a logical AND of the output of the second storage circuit 2231 and the signal ptx_sh.

The signals platen_rd, platen_sh, platrst_sh, platrst_fix, platen_fix, platen_fixa, ptx_rd, ptx_sh, pres_rd, and pres_sh are generated by the timing generation unit 40.

The configuration of the pixel pulse generation unit is not limited to the configuration shown in FIG. 5. The configurations of the first to the third storage units are the same as those in the first embodiment, so the descriptions will be omitted.

Next, the operation of the image pickup apparatus shown in FIGS. 1 and 5 will be described with reference to a timing chart shown in FIG. 6.

Here, an example will be described in which signal is read from the pixel in row A in the pixel array 10, then potentials of photodiodes of the pixels in row X and row Y are fixed, and further a shutter operation on the pixels in a total of 4 rows including row 0 and row 1 is performed. Here again, the shutter operation is an operation for resetting the photodiodes, and also referred to as initialization of pixels. At time t200 in FIG. 6, the D latch of the first storage unit 22 and the SR latches of the second storage unit 23 and the third storage unit 24 hold Low level. Also, the voltage vcc supplied to the drain terminals of the amplifying transistor and the reset transistor is High level.

A major difference from the operation of the first embodiment is a control method for setting the pixel to the selected state or the non-selected state. Here, differences from the operation described in the first embodiment will be mainly described.

Figure 6:
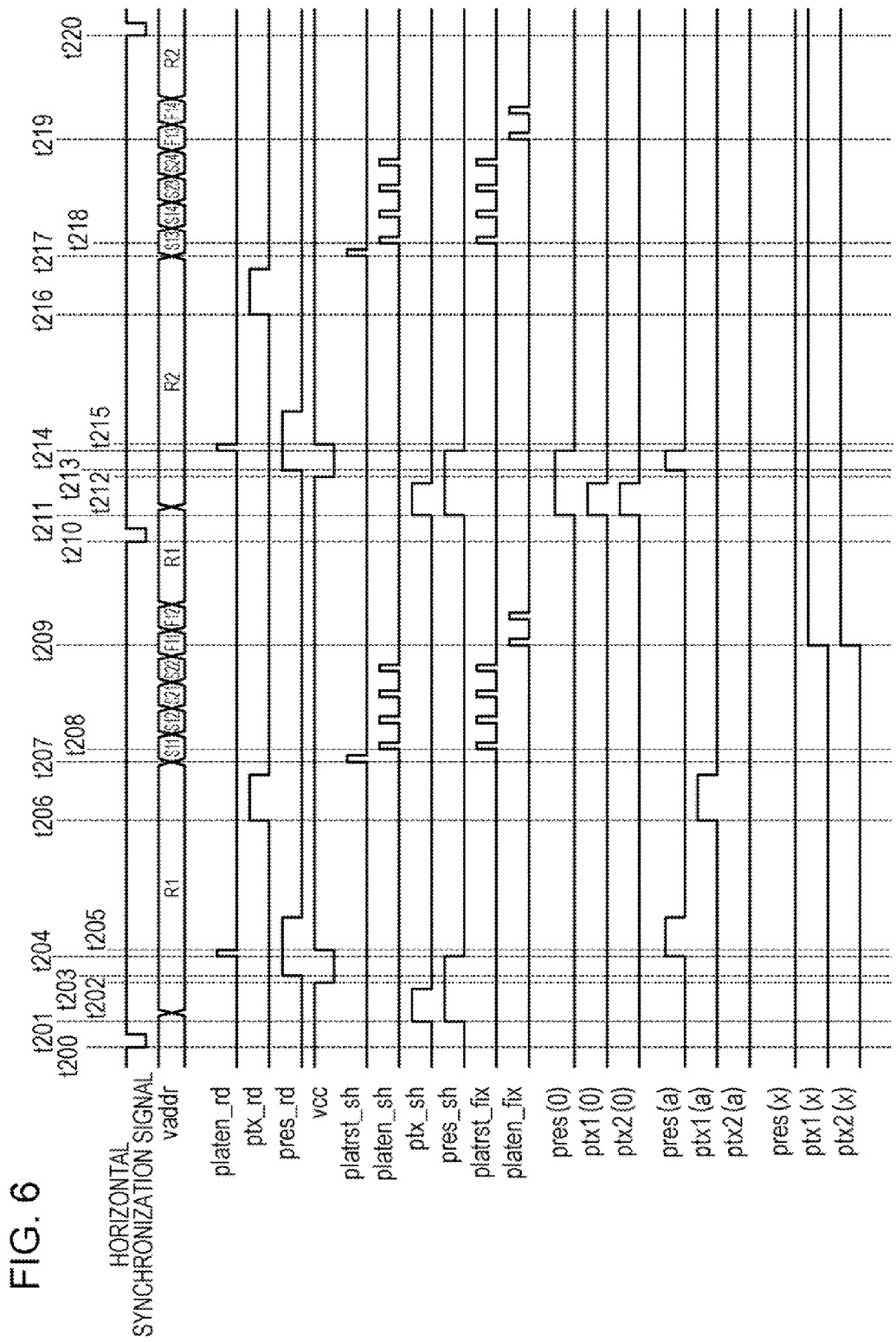
FIG. 6 is a timing chart showing an operation of the image pickup apparatus according to the second embodiment.

When the horizontal synchronization signal is inputted into the timing generation unit 40 from an external unit not shown in the figures at time t200 in FIG. 6, the timing generation unit 40 sets the signals ptx_sh and pres_sh to High level at time t201. Here, the SR latches of the second and the third storage circuits hold Low level, so the signals provided to the pixel block do not change.

At time t202, the signal vcc changes to Low level, and at time t203, the signal pres_rd becomes High level. At this time point, the D latches of the first storage circuits hold Low level, so that the signals provided to the pixel block do not change.

When the signal platen_rd becomes High level at time t204, the D latch of the first storage circuit 222A in the ath row indicated by the address signal R1 outputs a signal of High level. Thereby, the signal presi outputted from the pixel pulse generation unit 225A becomes High level, and as a result, the signal pres (a) provided to the pixel block 210A becomes High level. Thereby, the reset transistor M2104 in the pixel block 210A turns on. At this time point, the signal vcc is Low level, so that the FD portion F2101 in the pixel block 210A is reset to a low potential and becomes the non-selected state.

At time t205, the signal vcc becomes High level. At this time, the signal pres_rd and consequently the signal pres (a) are High level, so the FD portion F2101 in the pixel block 210A is reset to a high potential, and the pixel block becomes the selected state. Thereafter, when the signal pres_rd becomes Low level, the operation for setting the pixel block 210A to the selected state is completed. A signal that appears on the vertical signal line vline (n) in the period after this is a signal corresponding to the reset of the FD portion in the pixel block 210A. This signal includes a noise component caused by the reset transistor M2104, the amplifying transistor M2103, and the FD portion F2101. If the horizontal transfer unit 50 includes a CDS circuit, after the signal pres_rd changes to Low level, an output that appears on the vertical signal line vline (n) is sampled.

When the signal ptx_rd becomes High level at time t206, the output of the AND circuit 2250-5 becomes High level by the logical AND of the signal ptx_rd and the output of D latch of the first storage circuit 222A, and only the signal ptx1 ($a$) becomes High level. Thereby, when the charge held by the PD in the ath row is transferred to the FD portion F2101 via the transfer transistor M2101-1, the potential of the FD portion F2101 changes according to the amount of the transferred charge, and accordingly the signal that appears on the vertical signal line vline (n) changes. The signal at this time has changed by an amount corresponding to the amount of charge generated by photoelectric conversion with respect to the level immediately after resetting the FD portion F2101, so it is possible to reduce noise component by calculating a difference between the level of the signal and the noise component held by the CDS circuit. By the operation described above, the operation for reading a signal from the pixel in the first row is completed.

In the period from time t207 to time t210, an operation for storing shutter row addresses of a total of 4 rows including pixels in the zeroth row and the first row into the second storage circuit is performed, and the third storage circuits related to these rows are reset. The operation in this period is the same as that from time t106 to time t110, so the description will be omitted.

At time t210, the vertical synchronization signal is inputted and an operation related to the next row is performed.

When the signals ptx_sh and pres_sh become High level at time t211, the transfer transistor and the reset transistor of the pixel in the rows in which the second storage circuit is set in the period from time t207 to time t210 turn on. Thereby, the shutter operation of the pixels in 4 rows is performed.

After the signal vcc becomes Low level at time t212, the signal pres_rd becomes High level at time t213. When the signal pres_rd becomes High level, the signal pres (a) becomes High level by a logical AND of the signal pres_rd and the D latch of the first storage circuit in the ath row.

From time t214, the signal platen_rd temporarily becomes High level. Thereby, only the D latch of the first storage circuit in a row indicated by R2 outputs High level by the address signal vaddr, so that the signal pres (a) becomes Low level. At this timing, the signal vcc is Low level, so that the potential of the FD portion F2101 of the pixel in the ath row is low and the FD portion becomes the non-selected state.

When the signal pres_rd becomes Low level after the signal vcc becomes High level again at time t215, the potential of the FD portion F2101 of the pixel in a row indicated by the address signal of R2 becomes High and the row becomes the selected state.

After this, the operation that has already been described above is repeated, so the description will be omitted.

Also in this embodiment described above, it is possible to set a plurality of methods for resetting the photodiode in a row in which signal is not read from pixel. Thereby, in a row in which the second storage circuit is set in the period from time t208 to time 209, the PD is temporarily reset in the next horizontal synchronization period. On the other hand, in a row in which the third storage circuit is set in the period from time t209, the PD is continuously reset. In particular, according to this embodiment, the drain terminal of the reset transistor and the drain terminal of the amplifying transistor in each pixel block are connected to each other and provided with a common power source, and this is advantageous for reducing the size of the image pickup apparatus.

Third Embodiment

Figure 7:
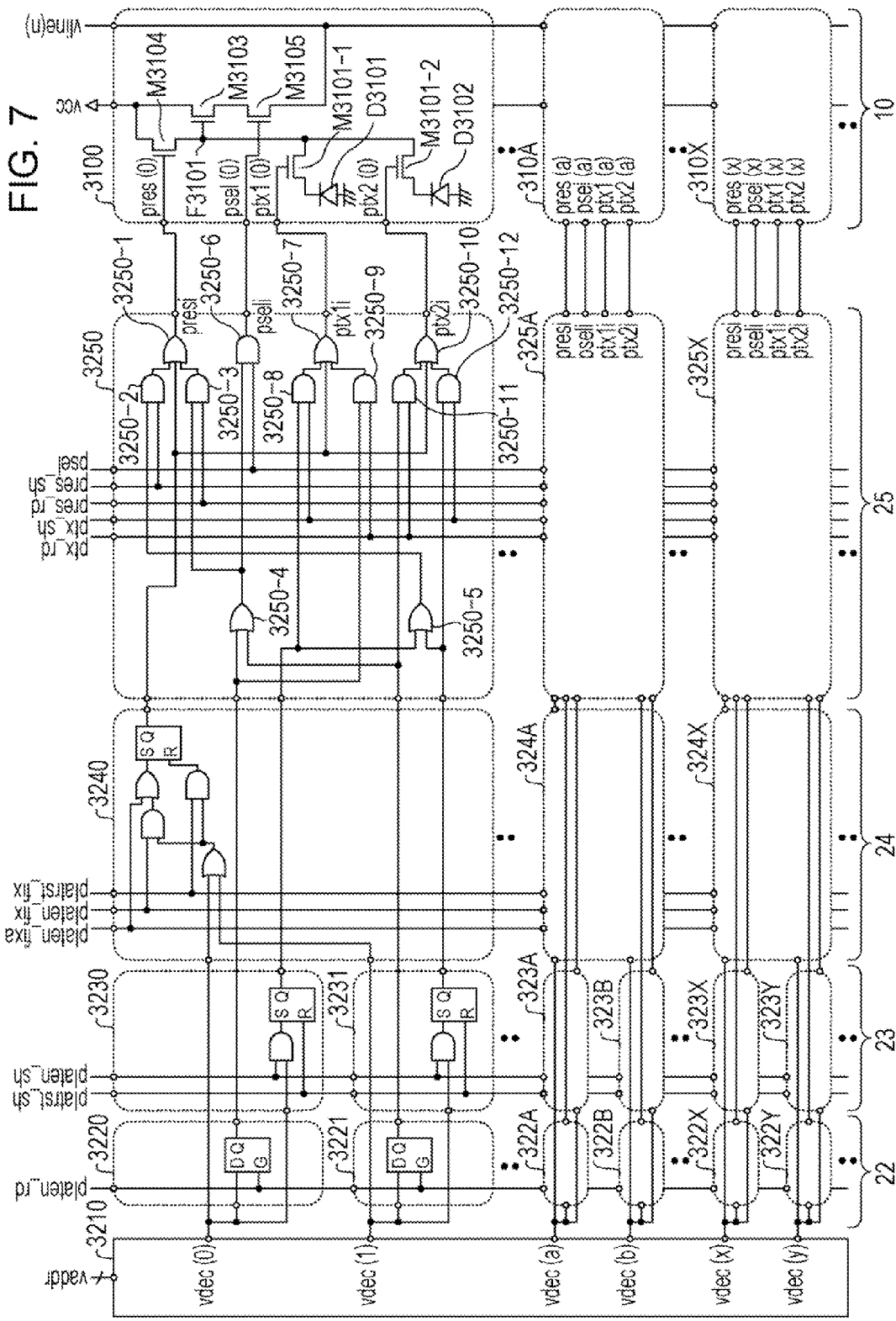
FIG. 7 is a circuit diagram showing a configuration example of an image pickup apparatus according to a third embodiment.

A third embodiment according to the present invention will be described with reference to the drawings. FIG. 7 is a circuit diagram in which portions except for the timing generation unit 40 and the horizontal transfer unit 50 are extracted from the configuration shown in FIG. 1 and shown in further detail. Hereinafter, differences from the first embodiment will be mainly described.

Although, in the first and the second embodiment, the image pickup apparatuses in which pixel does not include a selection transistor are described, the present invention can also be applied to an image pickup apparatus in which pixel includes a selection transistor. The pixel block 3100 has the same configuration as that shown in FIG. 5 except that the selection transistor M3105 is added.

Since the pixel block is changed, the configuration of the pixel pulse generation unit 25 is also changed from that of the second embodiment. In FIG. 7, a configuration example is shown in which the pixel pulse generation circuits 3250, 3251, and so on are formed by using AND circuits and OR circuits. The pixel pulse generation circuit 3250 outputs signals presi, pseli, ptx1i, and ptx2i, and the signals presi, pseli, ptx1i, and ptx2i are provided to the pixel block 3100 as pres(0), psel(0), ptx1(0), and ptx2(0) of the pixel block 3100 respectively.

The signal presi appears as an output of the OR circuit 3250-1 that outputs a logical OR of the output of the AND circuit 3250-2, the output of the third storage circuit 3240, and the output of the AND circuit 3250-3. The AND circuit 3250-2 outputs a logical AND of the output of the OR circuit 3250-5 that outputs a logical OR of the second storage circuits 3230 and 3231 and the signal pres_sh. The AND circuit 3250-3 outputs a logical AND of the output of the OR circuit 3250-4 that outputs a logical OR of the first storage circuits 3220 and 3221 and the signal pres_rd.

The signal pseli appears as a logical AND of the output of the OR circuit 3250-4 and the signal psel.

The signal ptx1i appears as an output of the OR circuit 3250-7. The OR circuit 3250-7 outputs a logical OR of the output of the AND circuit 3250-8, the output of the third storage circuit 2240, and the output of the AND circuit 3250-9. The AND circuit 3250-8 outputs a logical AND of the output of the second storage circuit 2230 and the signal ptx_sh. The AND circuit 3250-9 outputs a logical AND of the output of the first storage circuit 3220 and the signal ptx_rd.

The signal ptx2i appears as an output of the OR circuit 3250-10. The OR circuit 3250-10 outputs a logical OR of the output of the AND circuit 3250-11, the output of the third storage circuit 3240, and the output of the AND circuit 3250-12. The AND circuit 3250-11 outputs a logical AND of the output of the first storage circuit 3221 and the signal ptx_rd. The AND circuit 3250-12 outputs a logical AND of the output of the second storage circuit 3231 and the signal ptx_sh.

The signals platen_rd, platen_sh, platrst_sh, platrst_fix, platen_fix, platen_fixa, psel, ptx_rd, ptx_sh, pres_rd, and pres_sh are generated by the timing generation unit 40.

The configuration of the pixel pulse generation unit is not limited to the configuration shown in FIG. 7. The configurations of the first to the third storage units are the same as those in the first embodiment, so the descriptions will be omitted.

Next, the operation of the image pickup apparatus shown in FIGS. 1 and 7 will be described with reference to a timing chart shown in FIG. 8.

Here, an example will be described in which signal is read from the pixel in row A in the pixel array 10, then potentials of photodiodes of the pixels in row X and row Y are fixed, and further a shutter operation on the pixels in a total of 4 rows including row 0 and row 1 is performed. Here again, the shutter operation is an operation for resetting the photodiodes, and also referred to as initialization of pixels. At time t300 in FIG. 8, the D latch of the first storage unit 22 and the SR latches of the second storage unit 23 and the third storage unit 24 hold Low level.

A major difference from the first and the second embodiments is a control method for setting the pixel to the selected state or the non-selected state. In the first and the second embodiments, the pixel is set to the selected state by resetting the FD portion to a high potential, and the pixel is set to the non-selected state by resetting the FD portion to a low potential. On the other hand, in this embodiment, the pixel is set to the selected state by turning on the selection transistor provided between the amplifying transistor M3103 and the vertical signal line vline (n), and the pixel is set to the non-selected state by turning off the selection transistor. Here, differences from the operations described in the above embodiments will be mainly described.

Figure 8:
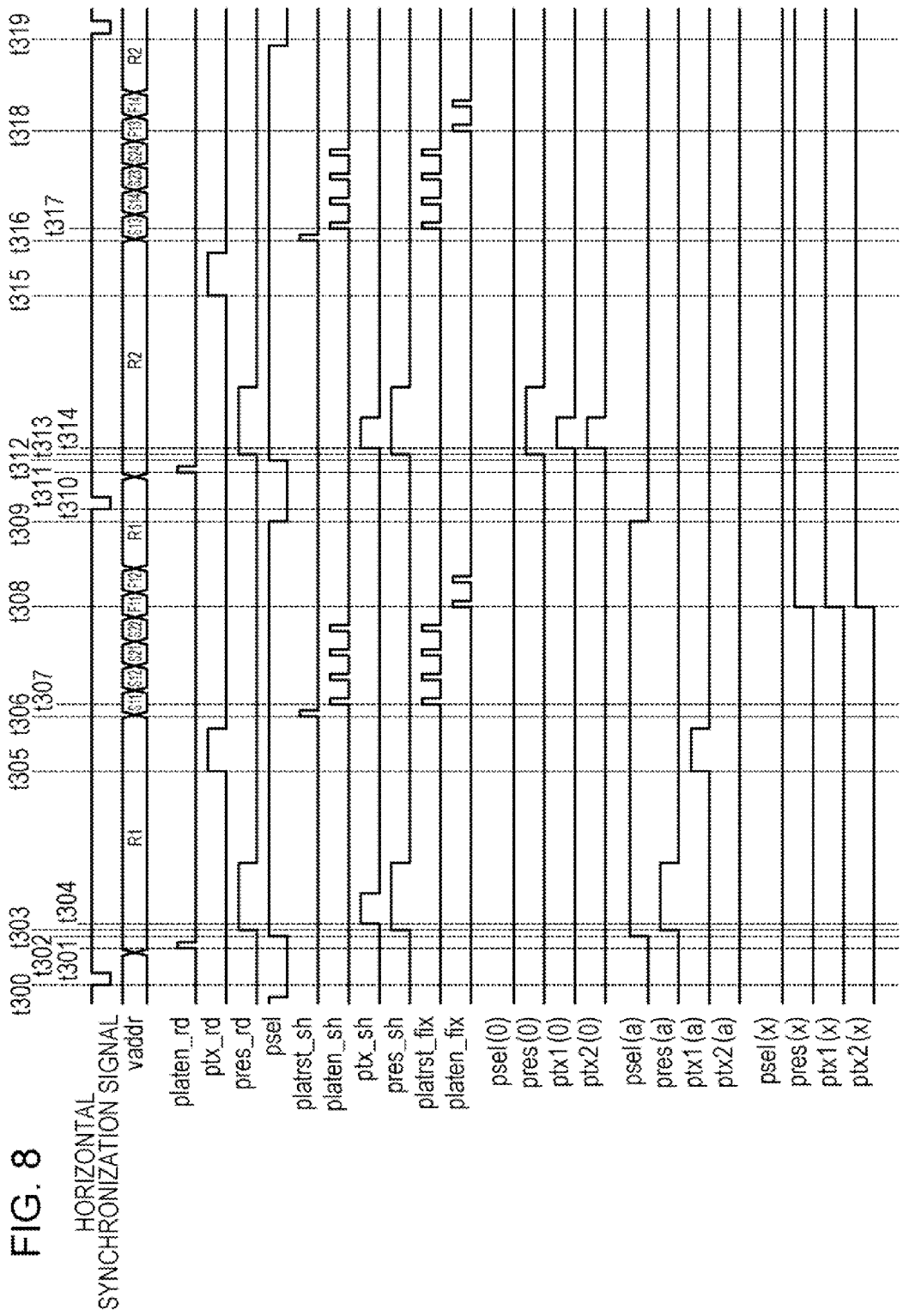
FIG. 8 is a timing chart showing an operation of the image pickup apparatus according to the third embodiment.

When the horizontal synchronization signal is inputted into the timing generation unit 40 from an external unit not shown in the figures at time t300 in FIG. 8, the timing generation unit 40 sets the signal platen_rd to High level at time t201. At this time, the address signal vaddr indicates R1=Ath row, so that only the vdec (a) of the outputs of the address decoder 3210 is High level, and only the D latch of the first storage circuit 322A outputs High level.

When the signal psel becomes High level at time t302, the output of the AND circuit 325A-6 of the pixel pulse generation unit 325A becomes High level and the selection transistor included in the pixel block 310A turns on. In this way, the pixel block 310A becomes the selected state.

When the signal pres_rd becomes High level at time t303, the OR circuit 325A-1 of the pixel pulse generation unit 325A becomes High level and the reset transistor included in the pixel block 310A turns on. Thereby, the FD portion F3101 in the pixel block 310A is reset. When the signal pres_rd becomes Low level after a certain time passes, the reset of the FD portion is completed. A signal that appears on the vertical signal line vline (n) in the period after this is a signal corresponding to the reset of the FD portion in the pixel block 310A. This signal includes a noise component caused by the reset transistor M3104, the amplifying transistor M3103, and the FD portion 3101. If the horizontal transfer unit 50 includes a CDS circuit, after the signal pres_rd changes to Low level, an output that appears on the vertical signal line vline (n) is sampled.

Although the signal pres_sh becomes High level at time t303 and the signal ptx_sh becomes High level at time t304, here the SR latches of the second and the third storage circuits hold Low level, so the signals provided to the pixel block do not change.

When the signal ptx_rd becomes High level at time t305, the output of the OR circuit 325A-9 becomes High level and only the signal ptx1 (a) becomes High level. Thereby, when the charge held by the PD in the ath row is transferred to the FD portion F3101 via the transfer transistor M3101-1, the potential of the FD portion F3101 changes according to the amount of the transferred charge, and accordingly the signal that appears on the vertical signal line vline (n) changes. The signal at this time has changed by an amount corresponding to the amount of charge generated by photoelectric conversion with respect to the level immediately after resetting the FD portion F3101, so it is possible to reduce noise component by calculating a difference between the level of the signal and the noise component held by the CDS circuit. By the operation described above, the operation for reading a signal from the pixel in the first row is completed.

The operation in the period from time t306 to time t309 is the same as that in the first and the second embodiments, so the description will be omitted.

When the signal psel changes to Low level at time t309, the selected state of the pixel block 310A is released.

At time t310, the vertical synchronization signal is inputted and an operation related to the next row is performed.

When the signal platen_rd becomes High level at time t311, the address signal vaddr indicates R2=b at this time, so the D latch of the first storage circuit 322A in the bth row outputs High level.

When the signals pres_sh becomes High level at time t313 and the signal ptx_sh becomes High level at time t314, the transfer transistor and the reset transistor of the pixel in the rows in which the second storage circuit is set from time t307 turn on. Thereby, the shutter operation of the pixels in 4 rows is performed.

As described above, in a row in which the second storage circuit is set in the period from time t307 to time t308, the PD is temporarily reset in the next horizontal synchronization period. On the other hand, in a row in which the third storage circuit is set in the period from time t308, the PD is continuously reset. As a result, a configuration, such as that of this embodiment, which includes selection transistors can realize different reset operations.

Fourth Embodiment

A fourth embodiment according to the present invention will be described with reference to FIG. 9.

In the first to the third embodiments, cases are described in which a cut-out operation using an electronic zoom operation is performed. On the other hand, the present invention can be applied to a case in which a thinning-out operation is performed.

Figure 9:
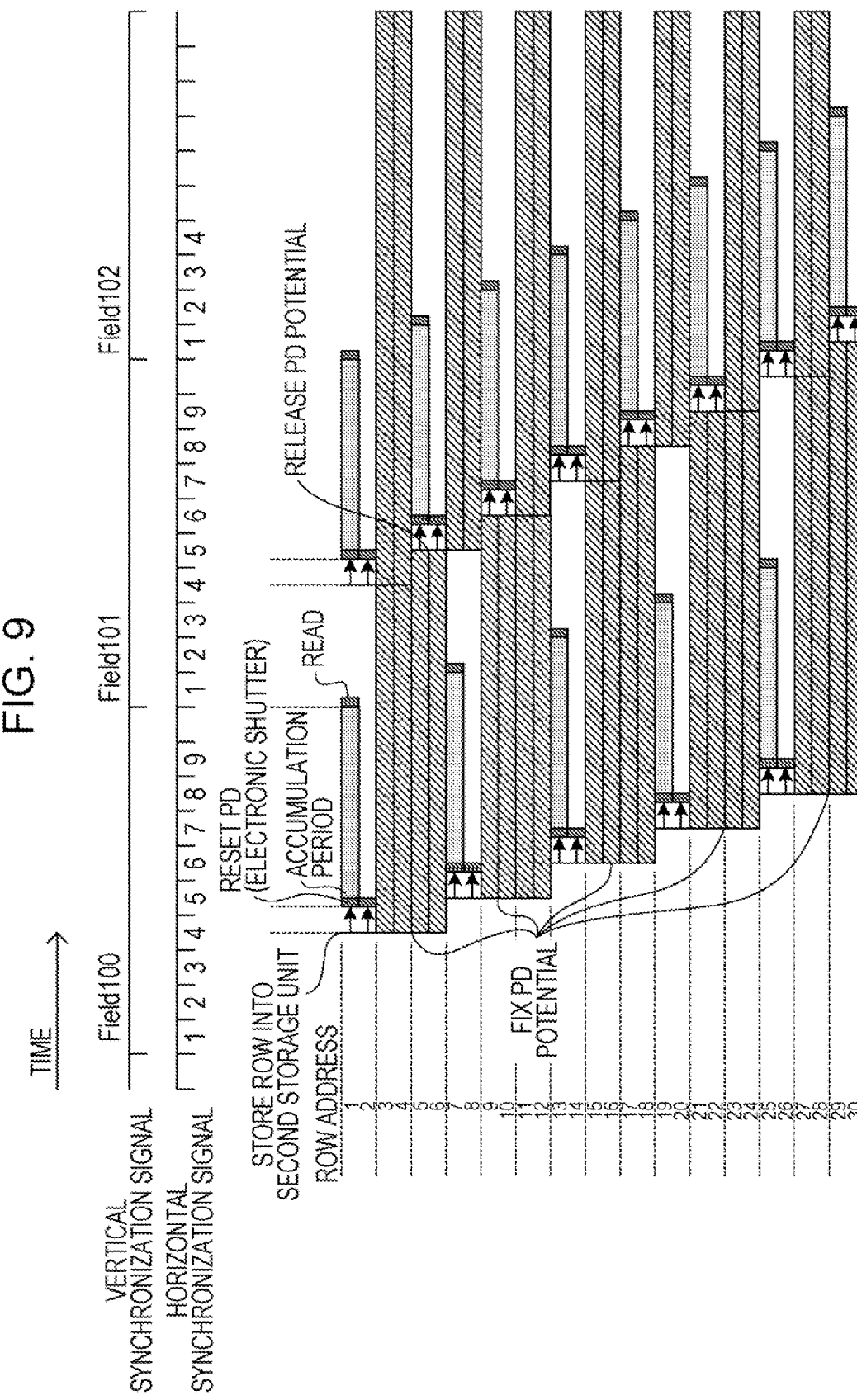
FIG. 9 is a timing chart showing an operation of an image pickup apparatus according to a fourth embodiment.

FIG. 9 is a timing chart showing an operation for changing rows which are thinned out, in other words, an operation for changing rows to be skipped without reading signals from pixels in consecutive fields. Specifically, in the Field 101, a ⅙ thinning out operation is illustrated in which signals are read from only one row selected from every 6 rows and the other 5 rows are skipped, and in the next Field 103, a ¼ thinning out operation is illustrated in which signals are read from only one row selected from every 4 rows and the other 3 rows are skipped. As illustrated in the first to the third embodiments, pixels in two rows adjacent to each other constitute one pixel block.

As described in the first to the third embodiments, when a plurality of pixels constitute one pixel block, the operation for fixing the potentials of PDs and the read or electronic shutter scan cannot be set in the same pixel block. Therefore, if signal is read from pixel in the first row in the Field 101, the potential of the PD in the second row cannot be fixed. Therefore, the electronic shutter scan is performed on the pixels in the first and the second rows at the same time.

In the period of the horizontal synchronization signal 4 in the Field 100, an operation for storing rows in which the electronic shutter scan is performed or the PD potential is fixed to the second or the third storage unit is started. This operation corresponds to, for example, the operation performed in the period from time t107 to time t110 in FIG. 4. Here, the addresses of the first row in which signal is read to the next field and the second row which constitutes one pixel block with the pixel of the first row are stored in the second storage unit, and the addresses of the third to the sixth rows are stored in the third storage unit.

In the period of the horizontal synchronization signal 5 in the Field 100, the PD reset operation of the rows whose addresses stored in the second storage unit in the period of the horizontal synchronization signal 4 is performed. A period from this time point until signal is read in the Field 101 is an accumulation period of the pixel of the first row. Also in the horizontal synchronization period 5, the same operation as that in the horizontal synchronization period 4 is performed on the pixels in the seventh to the twelfth rows.

Thereafter, the same operation is repeated during the period of Field 100.

In the next Field 101, the ⅙ thinning-out operation is performed in which signal is read from one row selected from every 6 rows, such as 1, 7, 13, and so on. In the Field 101, the electronic shutter scan corresponding to the read scan of the Field 102 and the fixing of the PD potential are performed. In the Field 102, the ¼ thinning-out operation is performed in which signal is read from one row selected from every 4 rows, such as 1, 5, 9, and so on. So, in the Field 101, the electronic shutter scan is performed on the rows of 1, 2, 5, 6, 9, 10, and so on, and in the other rows, the PD potential is fixed. In the Field 102, the read scan is performed on the rows of 1, 5, 9, and so on in which the accumulation period starts from the Field 101.

As obvious from the timing chart shown in FIG. 9, when the thinning-out operation is performed, the PD potential is fixed for the pixel that does not constitute a pixel block with the read row, and only when the rows that are thinned out are changed, the operation for releasing the fixed state of the PD potential is performed in synchronization with the electronic shutter scan. Therefore, according to the driving method of this embodiment described above, in the thinning-out operation, the change of the rows in which the PD potential is fixed can be performed seamlessly and continuously.

The embodiments described above can be combined together. Further, it is possible to dispose three or more of the storage units for controlling an element shared by a plurality of pixels.

The latches included in the first to the third storage units used in the embodiments described above are not limited to those illustrated. For example, all of the first to the third storage units may be SR latches. As shown in the figures, in a configuration in which one vertical signal line is provided to a column of pixels, a signal can be always read from only one column of pixels. Therefore, the set and the reset can be performed at the same time by using D latches in the first storage unit that stores the address of a row of the pixel from which signal is read. By using SR latches in the second and the third storage unit, latch is set when the output from the decoder is High level, and value is held when the output is Low level. By providing a common reset signal to a plurality of SR latches, the states of the latches can be collectively reset.

Fifth Embodiment

Next, an outline of an image pickup system according to the present invention will be described with reference to FIG. 10.

The image pickup system 800 includes, for example, an optical unit 810, an image pickup apparatus 1000, an image signal processing circuit unit 830, a recording/communicating unit 840, a timing control circuit unit 850, a system control circuit unit 860, and a reproduction/display unit 870. One of the image pickup apparatuses described in the above embodiments is uses as the image pickup apparatus 1000. Here, a case is illustrated in which the timing generation unit 40 is included in the timing control circuit unit 850 instead of the image pickup apparatus.

The optical unit 810, which is an optical system including a lens and the like, forms an image of light from an object on the pixel array, in which a plurality of two-dimensionally arranged pixels are arranged of the image pickup apparatus 1000, and forms an image of the object. The image pickup apparatus 1000 outputs a signal according to the light formed into an image on a pixel unit at a timing based on a signal from the timing control circuit unit 850.

The signal outputted from the image pickup apparatus 1000 is inputted into the image signal processing circuit unit 830, which is an image signal processing unit, and the image signal processing circuit unit 830 performs processing such as AD conversion on the inputted electrical signal in accordance with a method defined by a program or the like. The signal obtained by the processing in the image signal processing circuit unit is transmitted to the recording/communicating unit 840 as image data. The recording/communicating unit 840 transmits a signal to form an image to the reproduction/display unit 870 and causes the reproduction/display unit 870 to reproduce/display a movie or a still image. The recording/communicating unit receives a signal from the image signal processing circuit unit 830 and communicates with the system control circuit unit 860. Further, the recording/communicating unit performs an operation to record a signal for forming an image in a recording medium not shown in the figures.

The system control circuit unit 860 integrally controls the operation of the image pickup system, and controls the drives of the optical unit 810, the timing control circuit unit 850, the recording/communicating unit 840, and the reproduction/display unit 870. The system control circuit unit 860 includes a storage apparatus (not shown in the figures) which is, for example, a recording medium, and a program and the like necessary to control the operation of the image pickup system are recorded in the storage apparatus. The system control circuit unit 860 provides a signal for switching a drive mode according to, for example, a user operation in the image pickup system. Specific examples are a changing of the row to be read or the row to be reset, a changing of the angle of field due to electric zoom, a shifting of the angle of field due to image stabilizing.

The timing control circuit unit 850 controls the drive timing of the image pickup apparatus 1000 and the image signal processing circuit unit 830 based on control of the system control circuit unit 860 which is a control unit.

The embodiments described above are illustrative ones for implementing the present invention, and the embodiments can be variously modified or combined without departing from the technical idea of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-116398 filed May 20, 2010 which is hereby incorporated by reference herein in its entirety.

What is claimed is:

1. An image pickup apparatus comprising:
   a pixel array in which pixels are arranged in a plurality of rows and columns, each pixel including a photoelectric conversion unit; and
   a row selection unit configured to select a row in the pixel array,
   wherein the row selection unit includes
   an address generation unit configured to generate an address signal corresponding to an address of a row in the pixel array by time division multiplexing,
   a decoder configured to decode the address signal generated by the address generation unit and output a corresponding decode value,
   a first storage unit configured to store the decode value corresponding to an address of a row, from which signal is read, in the pixel array, and
   a second storage unit configured to store the decode value corresponding to an address of a row, on which initialization is performed, in the pixel array, and
   the row selection unit further includes a third storage unit configured to store the decode value corresponding to an address of a row, in which a potential of the photoelectric conversion unit is fixed, in the pixel array.

2. The image pickup apparatus according to claim 1, wherein
each of the pixels further includes
an amplifying transistor configured to output a signal based on a charge generated in the photoelectric conversion unit,
a transfer transistor configured to transfer a charge held in the photoelectric conversion unit to a node of the gate of the amplifying transistor, and
a reset transistor configured to reset the node of the gate of the amplifying transistor, and
controls the transfer transistor and the reset transistor based on the decode value stored in the third storage unit.

3. The image pickup apparatus according to claim 2, wherein
a drain terminal of the amplifying transistor and a drain terminal of the reset transistor are connected to each other.

4. The image pickup apparatus according to claim 2, wherein
a drain terminal of the amplifying transistor and a drain terminal of the reset transistor are connected to power sources different from each other.

5. The image pickup apparatus according to claim 2, wherein
each of the pixels further includes a selection transistor configured to set the pixel to a selected state or a non-selected state.

6. The image pickup apparatus according to claim 2, wherein
a plurality of the pixels share the amplifying transistor and the reset transistor.

7. An image pickup system comprising:
the image pickup apparatus according to claim 1, and
a timing generation unit configured to output a horizontal synchronization signal that defines a horizontal synchronization period in which signals of the pixels in a row are read.

8. The image pickup system according to claim 7, wherein for the second storage unit and the third storage unit of the same row, the timing generation unit performs an operation for storing the decode value in the second storage unit and an operation for initializing the third storage unit at the same time.

9. The image pickup system according to claim 7, wherein
in the same horizontal synchronization period, the image pickup apparatus performs initialization of the pixel from which signal is read based on the first storage unit along with initialization of a pixel selected based on the second storage unit.

10. The image pickup system according to claim 7, further comprising:
an optical system configured to form an image on a pixel unit of the image pickup apparatus, and
an image signal processing unit configured to process a signal outputted from the image pickup apparatus and generate image data.

11. A driving method of an image pickup apparatus which comprises a pixel array in which pixels are arranged in a plurality of rows and columns, each pixel including a photoelectric conversion unit, the driving method comprising:
selecting a row in the pixel array by a row selection unit, wherein said selecting a row includes:
generating an address signal corresponding to an address of a row in the pixel array by time division multiplexing by an address generation unit,
decoding the address signal generated by the address generation unit and outputting a corresponding decode value,
storing the decode value into a first storage unit corresponding to an address of a row, from which signal is read, in the pixel array, and
storing the decode value into a second storage unit corresponding to an address of a row, on which initialization is performed, in the pixel array,
storing the decode value into a third storage unit corresponding to an address of a row, in which a potential of the photoelectric conversion unit is fixed, in the pixel array, and
performing a shutter scan on the row stored in the second storage unit during a period in which potential of the row stored in the third storage unit is fixed.

12. The driving method of an image pickup apparatus according to claim 11, wherein for the second storage unit and the third storage unit of the same row, the driving method performs an operation for storing the decode value in the second storage unit and an operation for initializing the third storage unit at the same time.

13. The driving method of an image pickup apparatus according to claim 11, wherein
in the same horizontal synchronization period, the driving method performs initialization of the pixel from which signal is read based on the first storage unit along with initialization of a pixel selected based on the second storage unit.

14. The driving method of an image pickup apparatus according to claim 11, wherein
in a cut-out operation for cutting out a part of the pixel array and reading signals,
a read scan which reads signals from the pixel array based on the first storage unit performs a scan in a first direction, and
non-read rows located on the side different from the first direction from a start row of the read scan are scanned by a scan operation for fixing potentials of the photoelectric conversion units based on the third storage unit in a second direction different from the first direction.

15. The driving method of an image pickup apparatus according to claim 11, wherein
in a cut-out operation for cutting out a part of the pixel array and reading signals,
a read scan which reads signals from the pixel array based on the first storage unit performs a scan in a first direction, and
non-read rows located from an end row of the read scan on the side of the first direction are scanned by a scan operation for fixing potentials of the photoelectric conversion units based on the third storage unit in the first direction.

16. The driving method of an image pickup apparatus according to claim 11 further includes:
outputting a signal based on a charge generated in the photoelectric conversion unit by an amplifying transistor,
transferring a charge held in the photoelectric conversion unit to a node of a gate of the amplifying transistor by a transfer transistor, and
resetting the node of the gate of the amplifying transistor by a reset transistor, wherein a plurality of the pixels share the amplifying transistor and the reset transistor, and the pixel that shares the amplifying transistor and the reset transistor with the pixel from which signal is read based on the first storage unit performs a shutter scan based on the second storage unit and does not fix potential of the photoelectric conversion unit based on the third storage unit.

* * * * *